(12) United States Patent
Westover (10) Patent No.: US 7,591,627 B2
(45) Date of Patent: Sep. 22, 2009

(54) SUSPENDED WHEELED CARGO TRANSPORT APPARATUS AND SELF-STANDING PLATFORM

(76) Inventor: Erik A. Westover, 169 Albrecht La., Durango, CO (US) 81301

( * ) Notice: Subject to any disclaimer, the term of this patent is extended or adjusted under 35 U.S.C. 154(b) by 291 days.

(21) Appl. No.: 10/862,050

(22) Filed: Jun. 4, 2004

(65) Prior Publication Data

US 2004/0258510 A1    Dec. 23, 2004

Related U.S. Application Data

(60) Provisional application No. 60/475,476, filed on Jun. 4, 2003.

(51) Int. Cl.
*B60P 1/00* (2006.01)
(52) U.S. Cl. ...................... 414/476; 414/921
(58) Field of Classification Search ......... 414/481–485, 414/462, 471, 474, 476, 678; 296/20; 280/203, 280/204, 492–494, 650–655; 5/625, 118
See application file for complete search history.

(56) References Cited

U.S. PATENT DOCUMENTS

| | | |
|---|---|---|
| 910,728 A | 1/1909 | Russel |
| 1,934,141 A | 11/1933 | Russ |
| 2,416,492 A | 2/1947 | Neeley |
| 2,613,953 A | 10/1952 | Giovannoni |
| 2,811,367 A | 10/1957 | Goodale |
| 2,918,296 A | 12/1959 | Goodale |
| 2,924,831 A | 2/1960 | Hankins |
| 2,979,338 A | 4/1961 | Dwyer |
| 3,034,801 A | 5/1962 | Huston |
| 3,054,622 A | 9/1962 | Davis |
| 3,149,349 A * | 9/1964 | Nelson ........................ 5/610 |
| 3,236,537 A | 2/1966 | Eckman |
| 3,280,807 A | 10/1966 | Bardy |
| 3,901,525 A * | 8/1975 | O'Brien et al. ............... 280/14 |
| 3,989,270 A | 11/1976 | Henderson |
| 4,094,527 A | 6/1978 | Miller |
| 4,125,272 A | 11/1978 | Putnam |
| 4,173,353 A | 11/1979 | Steele |
| 4,179,770 A | 12/1979 | Nunes |
| 4,182,100 A | 1/1980 | Letter |
| 4,192,468 A | 3/1980 | Lawrence |

(Continued)

OTHER PUBLICATIONS

Hydraulic. The American Heritage® Dictionary of the English Language (2003). Retrieved Oct. 17, 2006, from xreferplus. http://www.xreferplus.com/entry/4096980.*

*Primary Examiner*—Saúl J Rodríguez
*Assistant Examiner*—Joshua I Rudawitz (57) ABSTRACT

A device to facilitate transporting an injured person or cargo over rough terrain having an elongated rigid load bed riding on adjustable air-sprung suspension over a wheel assembly having a narrow track. The device includes handles extending from each end which can be used to control the device during movement or which can by folded down to provide vertical supports to maintain a stable stationary unattended position. The air suspension is utilized to actively raise and lower the device to facilitate changing between movable and stationary configurations. Brakes are provided on the wheels for control while descending, independent of the security of the footing of the operator(s). The device also provides for being towed utilizing a universal-joint connector to a towed vehicle which allows flexibility of the connection but prevents torsional movement and maintains side-to-side stability of the towed device.

16 Claims, 9 Drawing Sheets

U.S. PATENT DOCUMENTS

| | | | |
|---|---|---|---|
| 4,205,453 A | 6/1980 | Steele | |
| 4,248,561 A | 2/1981 | Graves | |
| 4,266,793 A | 5/1981 | Pryor | |
| 4,389,066 A * | 6/1983 | Weir et al. | 296/19 |
| 4,466,632 A | 8/1984 | DeVorak | |
| 4,475,726 A * | 10/1984 | Smith | 269/41 |
| 4,548,423 A | 10/1985 | Craven | |
| 4,577,884 A | 3/1986 | Harris | |
| 4,593,841 A | 6/1986 | Lange | |
| 4,711,461 A | 12/1987 | Fromberg | |
| 4,717,054 A | 1/1988 | Vanzant | |
| 4,725,068 A | 2/1988 | Taylor et al. | |
| 4,768,803 A | 9/1988 | Hewitt et al. | |
| 4,789,180 A * | 12/1988 | Bell | 280/652 |
| 5,005,844 A | 4/1991 | Douglas | |
| 5,042,840 A | 8/1991 | Rieple et al. | |
| 5,215,318 A | 6/1993 | Capraro | |
| 5,236,215 A | 8/1993 | Wylie | |
| 5,242,176 A * | 9/1993 | Hendrickson | 280/25 |
| 5,244,217 A | 9/1993 | Kotulla | |
| 5,269,548 A | 12/1993 | Milligan | |
| 5,283,919 A * | 2/1994 | Grant | 5/620 |
| 5,348,112 A * | 9/1994 | Vaillancourt | 180/227 |
| 5,460,307 A | 10/1995 | Stevenson | |
| 5,470,088 A * | 11/1995 | Adams | 280/204 |
| 5,537,700 A * | 7/1996 | Way et al. | 5/611 |
| 5,577,752 A | 11/1996 | Johnson | |
| 5,645,292 A * | 7/1997 | McWilliams et al. | 280/494 |
| 5,687,978 A | 11/1997 | Rhodes | |
| 5,788,257 A | 8/1998 | Meyerhofer | |
| 5,820,141 A | 10/1998 | Wilkerson | |
| 5,829,536 A | 11/1998 | Pigg et al. | |
| 5,975,549 A | 11/1999 | Ockenden | |
| 6,076,842 A | 6/2000 | Knoer | |
| 6,131,917 A | 10/2000 | Walsh | |
| 6,193,261 B1 | 2/2001 | Hahka | |
| 6,199,508 B1 | 3/2001 | Miale | |
| 6,227,556 B1 | 5/2001 | Ockenden | |
| 6,230,662 B1 | 5/2001 | Miale | |
| 6,234,503 B1 | 5/2001 | Ockenden | |
| 6,283,496 B1 | 9/2001 | Dickmann | |
| 6,332,626 B1 | 12/2001 | Morrill | |
| 6,502,847 B1 | 1/2003 | Greaves | |
| 6,554,307 B1 | 4/2003 | Ockenden | |
| 6,612,604 B2 | 9/2003 | Greaves | |
| 6,688,635 B1 * | 2/2004 | Watts | 280/652 |
| 6,739,614 B2 | 5/2004 | Holmgren et al. | |
| 6,764,092 B1 | 7/2004 | Greaves, Jr. | |
| 6,941,686 B2 | 9/2005 | Cusick | |

* cited by examiner

SUSPENDED WHEELED CARGO TRANSPORT APPARATUS AND SELF-STANDING PLATFORM

PRIOR APPLICATIONS

This application is a based upon applicant's provisional patent application Ser. No. 60/475,476 filed Jun. 4, 2003 which is hereby incorporated herein by reference.

BACKGROUND OF THE INVENTION

The present invention relates to improvements in wheeled carts particularly suited to the transport and handling of injured persons over rough or uneven terrain.

SUMMARY OF THE INVENTION

While primarily intended for use on unimproved natural terrain such as foot trails, such carts may have additional application for transport of patients where other methods of manual transport are not well suited. These may include situations involving uneven manmade terrain such as in a stadium or any type of stairway and may be beneficial in emergency situations such as when simple power outage has rendered access to upper floors of a building difficult or in more severe situations such as following an earthquake, hurricane, tornado or other natural disaster where a normally smooth pathway may be difficult to navigate due to scattered debris or damage to the surface.

Such devices may also be suitable to the transport of any type of load especially those which may be too heavy or bulky for convenient transport by backpack.

In particular, the present invention provides a rigid bed or frame large enough to accommodate a person lying flat on his or her back and provides additional features which enhance the comfort of the person being transported and the control by those who are moving the cart. The device additionally provides a self-standing capability so the device can easily loaded or unloaded and can also serve as a stable bed or table for treating a patient in the field. This self-standing capability also allows the device to serve as a stable work platform or support when used for cargo or tools.

The present invention comprises an elongated flat rigid frame or bed capable of accepting a stretcher to accommodate an injured a person. Handles extending from each end of the bed are adjustable through a number of positions and lockable in each position. One such position has the handles folded nearly flat against the bed for compactness and ease of storage or transport. In a second position the handles are extended forward from the bed provided to provide suitable control for a transporter at each end of the bed. In a third position the handles are extended vertically downward from the bed to support the bed in a fixed stable elevated position.

The device uses a single wheel or multiple wheels in a narrow configuration to achieve a number of benefits. A narrow footprint allows use of the device on foot trails which may be very narrow. It is also the case however that having a single wheel provides a single point or very narrow area of contact so that the bed of the cart can be kept essentially level regardless of any side slope or irregularity of the terrain being traveled over. Manually operable brakes are added to the wheel assembly to allow ease of control of the device, particularly for descending on sloping terrain or a stairway.

One or more lever controls mounted to one or both of the sets of handles provides a means of actuating the brakes hydraulically or mechanically so that speed of the device can be easily and readily controlled by one operator of the device.

The bed is further fitted with a hitch for attaching the device to a powered method of transport such as a small all-terrain-vehicle ("ATV") or snowmobile. The hitch comprises a pivoting structure such as that found in a normal universal joint so as to permit bending or angular movement between the device and the tow vehicle, i.e. both vertical and horizontal side-to-side flexibility. However, despite the flexibility of the connection, relative twisting or torsional movement is prevented, so that the side-to-side orientation of the bed is kept securely generally horizontal and/or parallel to the side-to-side orientation of the tow vehicle.

The wheel or wheels of the device are mounted to the end of elongated pivoting swingarm and suspended by a pair of telescoping cylinders which accept compressed gas to serve as an adjustable spring or suspension element. To provides springlike relative movement and vertical flexibility between the rigid frame and a wheel or ski assembly in contact with the ground. The spring cylinder is provided with a valve to allow release of the compressed gas to reduce the internal pressure, or to increase the internal pressure by the addition of gas from an external source, namely a separate tank of compressed gas. By virtue of the adjustability of the pressure of the gas in the suspension system the suspension is adjustable. This accomplishes numerous benefits. First, it prevents the suspension from being too soft which might result in "bottoming out" and the sudden jolt that what occurred to an occupant if this should happen. It also prevents the suspension from being too hard in which case there would be very little suspension travel and very little cushion to the ride. Additionally the "ride height" can be set and maintained at a relatively constant level which may be most appropriate for the operators guiding the device and be kept constant over a wide variety of loads.

The air suspension further allows the device to be raised and lowered at will. In conjunction with the multiple position handles which become "legs" for the device when they are positioned vertically and are used to support the weight of the load the so that the device can be left in a stable position when unattended or when being loaded or unloaded. Conversely, the air system can be activated to raise the load up off of the handles to be supported primarily by the wheel when the device is to be transported again. Once the handles are free of weight they can be rotated to a generally horizontal position where they are locked in place and the suspension is adjusted to the appropriate height for transporting the load or patient.

The device is general used with a single relatively wide wheel of the type used on an "all terrain vehicle" or "ATV." As an alternative the device provides for use a dual wheels in a relatively narrow configuration straddling the swingarm which gives most of the benefits of a single wheel. The dual wheel configuration can be made relatively lightweight and yet quite sturdy using a spoked wheel construction as is used for bicycle wheels.

The typical sequence of steps for use is as follows:
1. Starting with the operator controls (handles) in the downward position, the air shocks are depressurized so that no load is supported by the wheels and the bed is held stationary and stable.
2. The cargo is placed on the platform and secured with tie-down straps.
3. With one person at one end of the platform, the air shocks are then pressurized to lift the load onto the wheels, and off the operator controls (stands).
4. With the platform stabilized by operator, the operator controls are then rotated upward into the driving position.

5. To provide optimal ride comfort for the load (patient), the air pressure is then released to position the load in the middle of the suspension travel range.
6. During transport, the operators (fore and aft) propel the device over the terrain at a walking speed. During transport the tandem wheels follow the contour of the terrain through the rotating motion allowed by the cushion hub. This allows the operators to maintain the platform in a level position as they travel through uneven terrain. Simultaneously the swinging arm air-suspension system travels in an up and down motion to absorb impacts from the terrain. To aid the stopping and control of the device, the disc brake system is activated via the lever positioned on the rear operator controls.
7. Once device is stopped; the air suspension system is pressurized to raise the platform to the top of the suspension travel range. The operator controls are then rotated back to the downward stand position, and the air suspension system is depressurized to lower platform onto the stands. Patient litter/cargo may now be unloaded from the platform.

BRIEF DISCUSSION OF PRIOR ART

The following patents are representative of prior art related to patient and load transporting devices:

U.S. Pat. No. 910,728 to Russel discloses a simple hand-propelled two wheeled ambulance with separate stationary supporting means.

U.S. Pat. No. 2,416,492 to Neeley discloses a collapsible single wheeled load carrying device.

U.S. Pat. No. 2,613,953 to Giavannoni discloses a single wheeled load carrying device.

U.S. Pat. Nos. 2,811,367 and 2,918,296 to Goodale disclose a foldable single wheeled load carrying device pulled behind a person U.S. Pat. No. 2,924,831 to Hankins discloses a combination backpack frame and stretcher.

U.S. Pat. No. 2,979,338 to Dwyer discloses a single-wheeled game cart.

U.S. Pat. No. 3,034,801 to Huston discloses a single-wheeled game cart.

U.S. Pat. No. 3,054,622 to Davis et al. discloses a wheeled game cart and load carrying device which can be transported on the back of a person.

U.S. Pat. No. 3,236,537 to Eckman discloses a single wheeled collapsible cart for transporting persons or light loads.

U.S. Pat. No. 4,789,180 to Bell discloses a two wheeled utility cart for transporting large heavy loads over rough terrain.

U.S. Pat. No. 5,005,844 to Douglas is another load carrier pulled behind a person.

U.S. Pat. No. 5,687,978 to Rhodes, et al. discloses a foldable load conveyance apparatus with a self supporting capability.

U.S. Pat. No. 5,820,141 to Wilkerson discloses a flat framed cart with a large pneumatic wheel for transporting game or a victim over irregular terrain.

U.S. Pat. No. 6,283,496 to Dickmann discloses a two-wheeled game carrier.

OBJECTIVES OF THE INVENTION

It is an objective of the present invention to provide a wheeled carrier for cargo which is readily adaptable to transporting a load or patient in conditions of rough or rugged terrain including narrow trails or difficult manmade conditions such as stairways.

It is another objective of the present invention to provide a wheeled carrier for an injured person which provided increased security and safety in the handling of the patient.

It is another objective of the present invention to provide a wheeled carrier for an injured person which provides increased comfort for the patient being handled.

It is another objective of the present invention to provide a wheeled carrier for a heavy load which provides greater control by the operators.

It is another objective of the present invention to provide a wheeled carrier for a heavy load which provides a means of supporting the load in a stable manner when the device is stationary.

It is another objective of the present invention to provide a wheeled carrier for a heavy load which minimizes the difficulty of changing from a stable self-supporting stationary configuration to readily transportable configuration.

It is another objective of the present invention to provide a carrier having the aforementioned benefits and which is adaptable for use a variety of difficult conditions, by for example, allowing skis or skids to be readily installed in place of wheels.

DESCRIPTION OF THE PREFERRED EMBODIMENT

The main frame of the device of the preferred embodiment is a elongated flat rigid platform 1 in a generally ladder-like configuration of side rails 3 and cross members 4 of aluminum or similar or lightweight alloy. The upper surface can be configured in any appropriate manner for accommodating the intended load. A simple flat open frame is particularly suitable for attachment of a litter 40 or other similar device which may be used to immobilize and transport an injured person. An extension or handle 2 is pivotably mounted at each end of the frame. When extended generally horizontally and locked into position the handles provide appropriate leverage for persons guiding and operating the device. A simple locking mechanism is provided to allow the handles to be fixed in any desired position. When extended generally vertically downward and locked into position the handles provide a stable support base to allow the frame to stand unattended.

Figure 1:
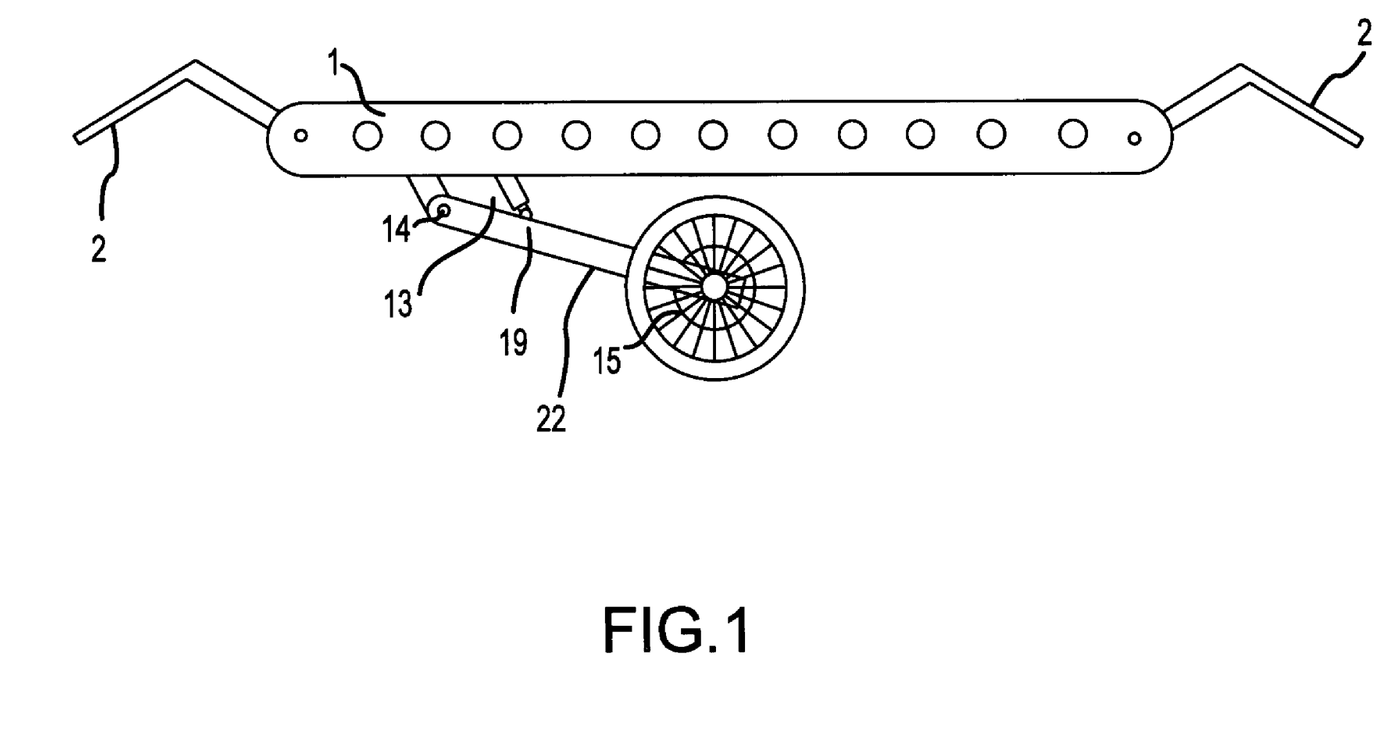
FIG. 1 is a side view of the device of the preferred embodiment showing the handles in a raised position for maneuvering operation of the device.
Figure 2A:
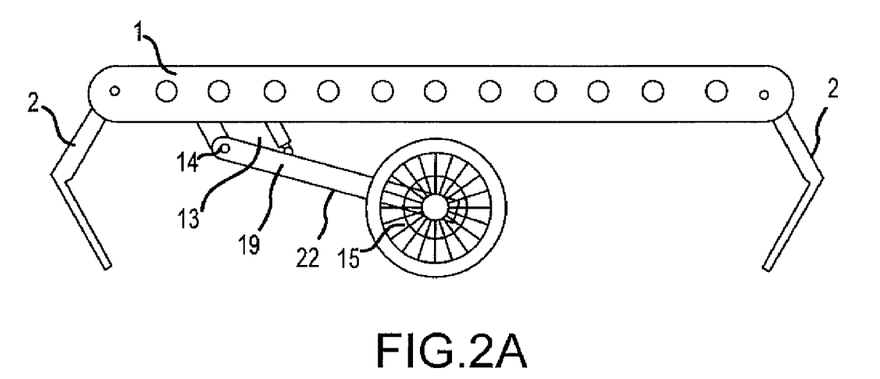
FIG. 2A is a side view of the device of the preferred embodiment showing the handles in a lowered position for supporting the device in stationary stabilized operation of the device.
Figure 2B:
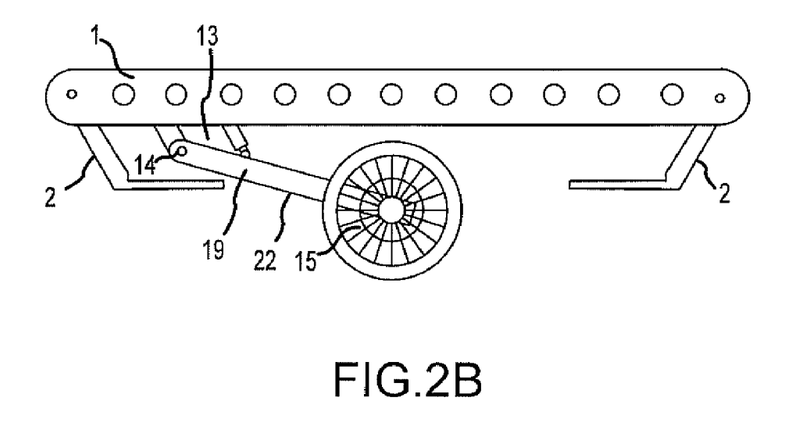
FIG. 2B is a side view of the device of the preferred embodiment showing the handles in a folded position for compactness and ease of storage or transport of the device.
Figure 3:
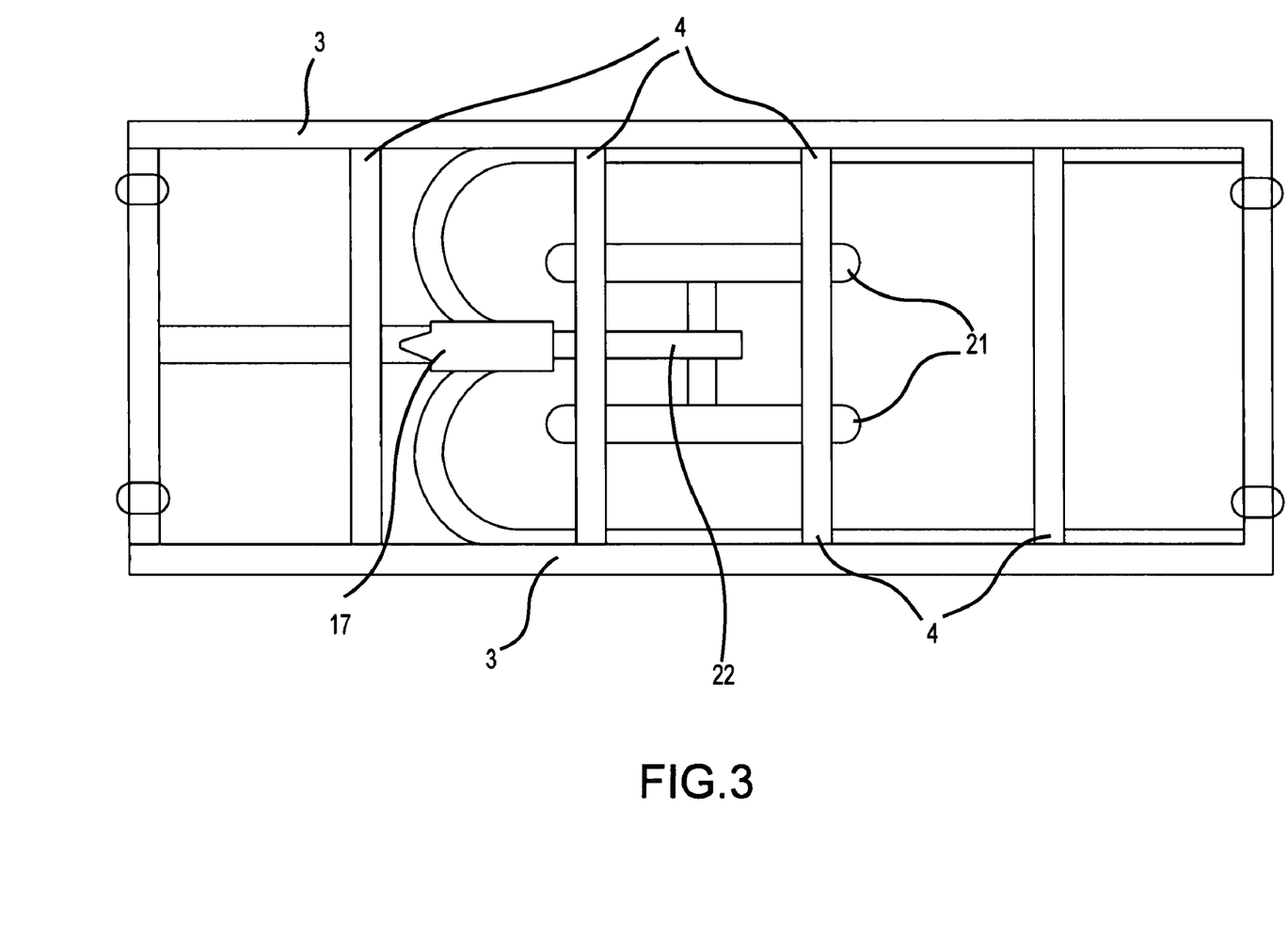
FIG. 3 is a top view of the device of an alternative embodiment using dual wheels.
Figure 4:
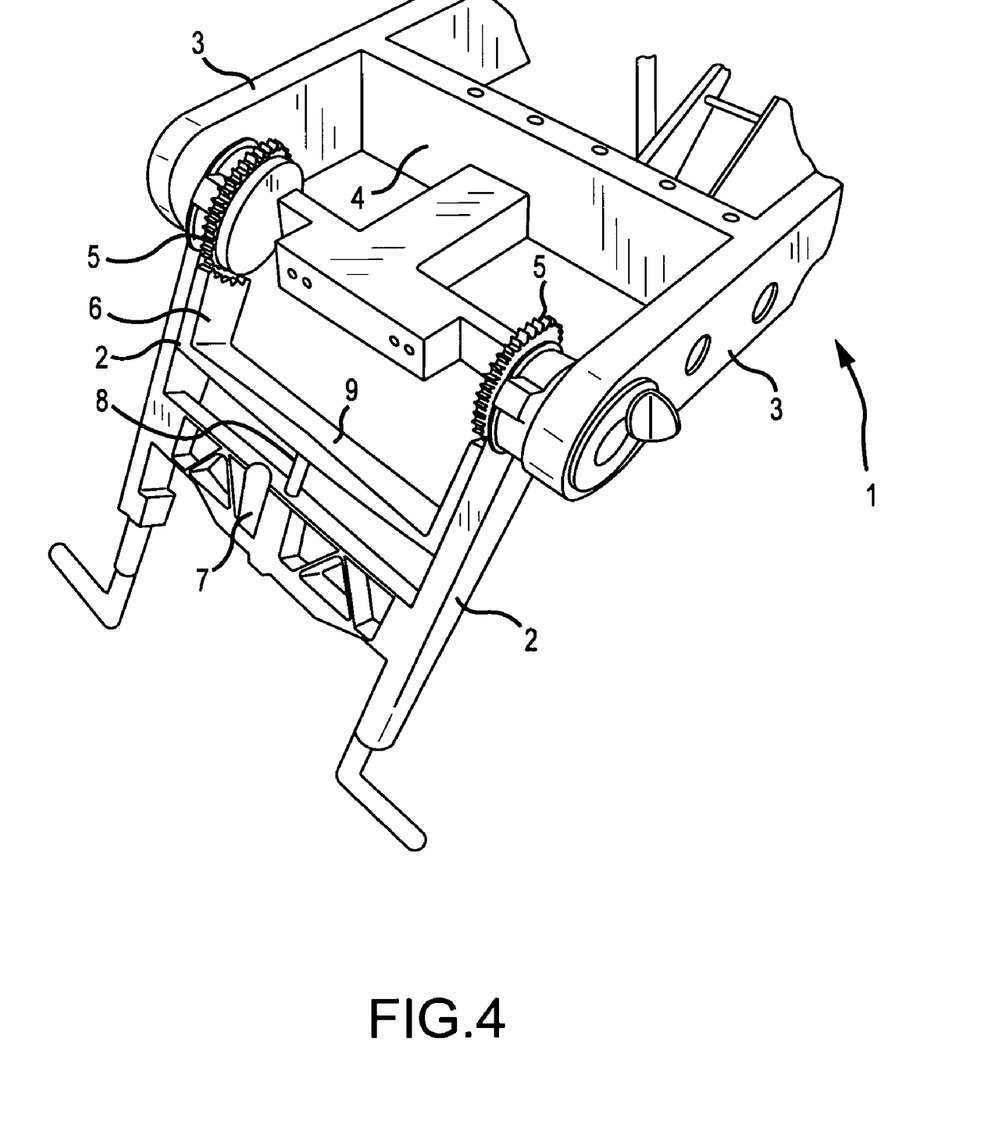
FIG. 4 is a perspective view showing detail of the operator controls or handles in a lowered position.

A simple locking mechanism is provided to allow the handles to be fixed in any desired position. A suitable form of locking mechanism comprises a pair of fixed toothed gears 5, each mounted just inside of a frame side rail 3 and engageable around its circumference by a mating tooth assembly 6. The pair of mating tooth assemblies are operated simultaneously to positively engage and disengage the gear assemblies by movement of a lever 7 which moves a rod 8 along its axis and which is attached generally perpendicular to a bar 9 which also moves. One tooth assembly 6 is connected to each end of the bar so that the respective tooth assemblies move simultaneously into or out of engagement with their respective gear assemblies 5 as the bar is moved.

The frame is supported on a suspension and wheel assembly to allow transport of the device over the a ground surface. The suspension comprises an elongated swing arm 22 mounted to a pivot point 14 near the front of the frame and supported by a pair of spring members 13 comprising sealed telescoping cylinders filled with compressed gas. The cylinders are commercially available devices sold for use in the suspension of off-road bicycles. The spring members 13 are provided with a remotely mounted valve to allow release of gas pressure from the cylinders to lower the device. An external cylinder 17 is mounted within the frame 1 to provide a reservoir of compressed gas which communicates with the spring members through a sealed pressure line and valve to allow a selective increase of the gas pressure of the spring members. Accordingly, even with a load in place the frame can be raised and lowered at will to allow the device to be set down onto the handles when a stable platform is desired or raised off the handles to be supported by the wheels when the device is to be moved. For movement of a load with the device, there will typically be a desirable "ride height" that is maximizes the benefits of the suspension and/or is most convenient for the operators. Once this height is established, it can be readily achieved repeatedly by using a simple reed type proximity switch 18 actuated by a magnet mounted on the swing arm. The switch is positioned so to complete a simple electrical circuit and illuminate an indicator light when the swing arm is pivoted to the position corresponding to the chosen ride height.

Figure 5:
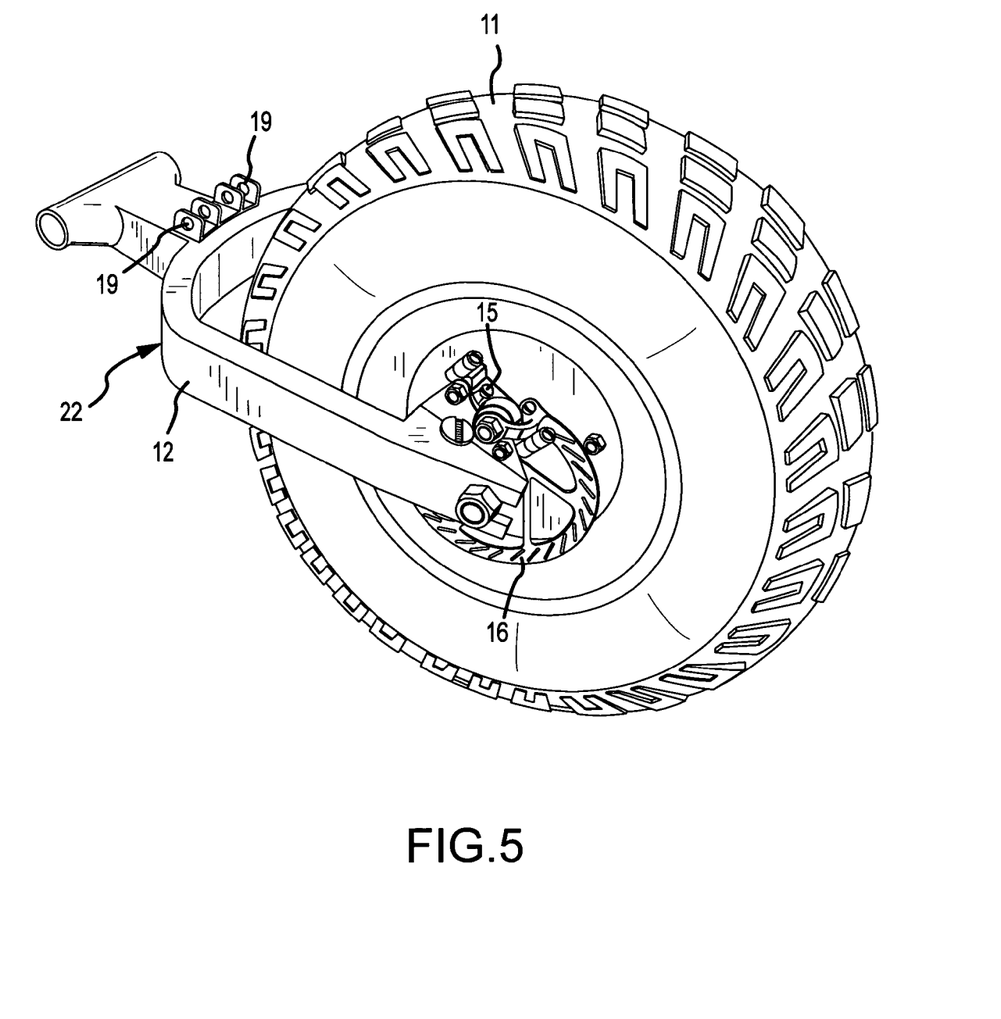
FIG. 5 is a perspective view showing detail of the swing arm and wheel assembly of the preferred embodiment using a single wheel.

The preferred wheel assembly uses an ATV type wheel and tire approximately 22 inches in diameter and having a cross sectional width of approximately 9 inches. While a larger wheel may roll more efficiently over rough ground the chosen size allows a suitable height of the bed above the ground while still allowing room for travel of the suspension. The wheel is mounted in a swing arm/yoke assembly 12 which is attached to the frame at pivot point 14 and supported by the spring members extending between the frame 1 and a midpoint 19 of the swing arm 22. A manually operable brake mechanism 15 is mounted to the swing arm to engage a brake disk 16 attached to the wheel. The braking mechanism is of a manual hydraulically operated disk type sold commercially for use on off-road bicycles. However it is recognized that any suitable braking mechanism may be used and that readily available types include drum, disk and caliper brakes. Of those, several methods of remote actuation are available, the most common being mechanical and hydraulic actuation by means of a remotely positioned lever. The brake actuating lever of the present device is preferably located on the rear handle so as to be readily accessible and operable by an operator, but multiple levers may also be used.

An alternative wheel assembly using dual wheels is shown in FIG. 5. In this alternative the wheels are lightweight bicycle type wheels and pneumatic tires 21 positioned close together on opposite sides of an elongated swingarm 22. Each wheel is provided with disk brake of the same type and in the same manner as in the preferred embodiment previously. The wheel assembly is preferably mounted so as to provide limited pivoting movement about a longitudinal horizontal axis so that both wheels can remain in contact with the ground surface to bear weight as the device passes over, for example, terrain having a sideways slope while the bed remains generally level side-to-side. The swingarm end is provided with a biased rotating assembly to the wheel assembly allow a range of approximately 20 degrees of movement about the longitudinal axis of the swingarm. This movement allows the dual wheels more freedom to follow terrain irregularities and minimizes the possibility of one wheel having to suddenly bear the entire load.

Figure 5A:
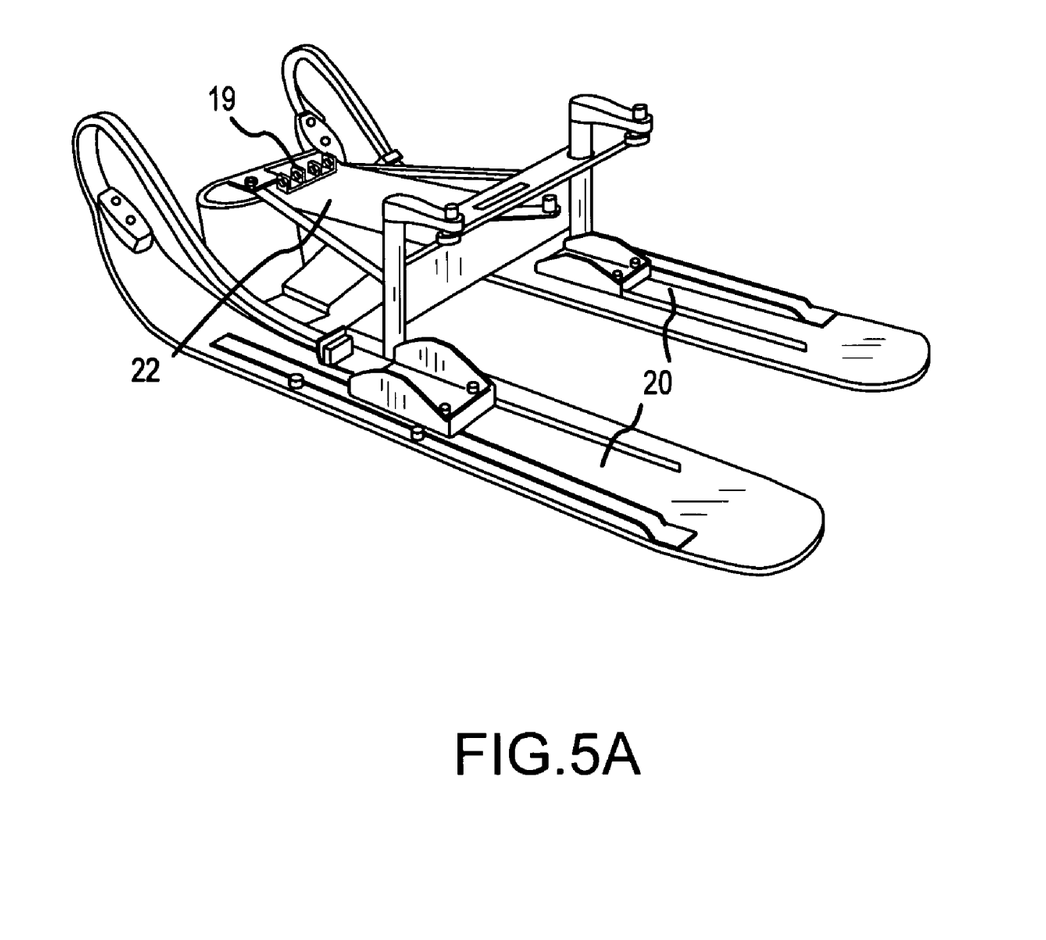
FIG. 5A is a perspective view of a ski assembly usable in place of the wheel of FIG. 5
Figure 6:
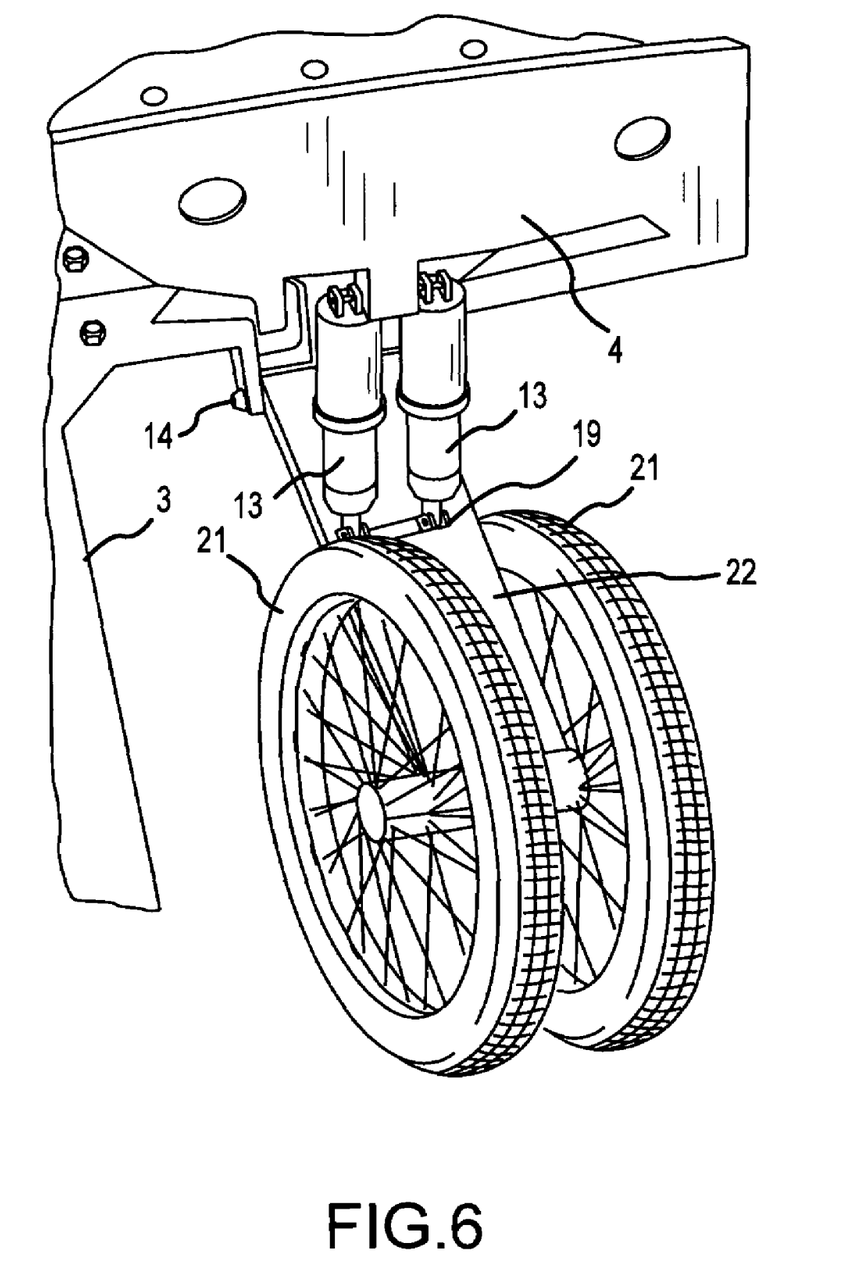
FIG. 6 is a perspective view showing detail of the swing arm and wheel assembly of an alternative embodiment using a pair of lightweight wheels.
Figure 7:
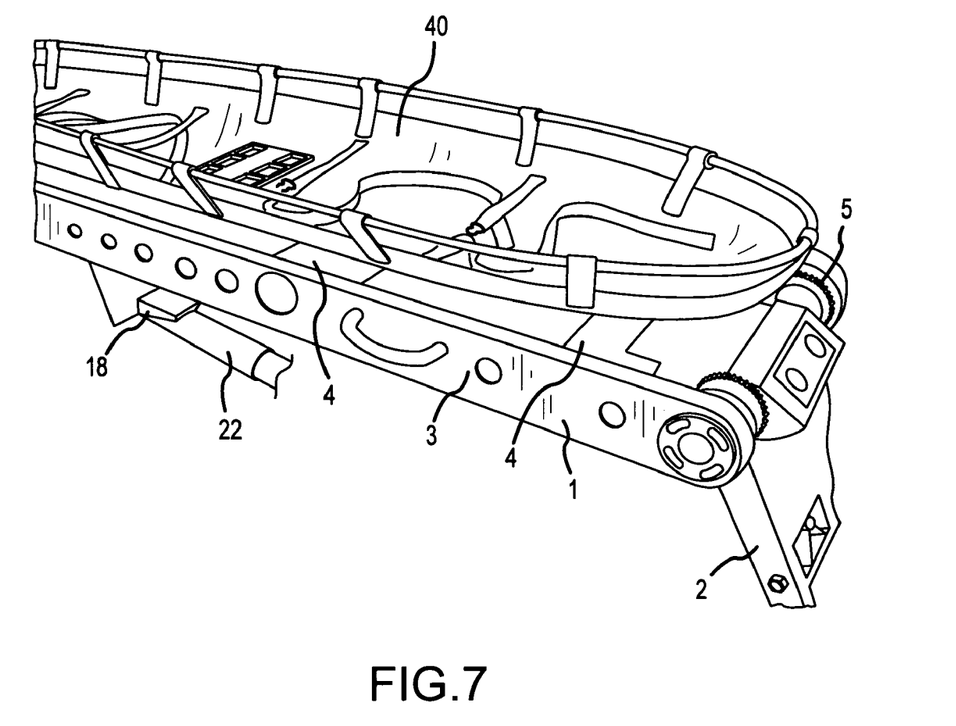
FIG. 7 is a perspective view showing a litter in place on the bed and further showing detail of the swing arm of the two wheeled alternative embodiment without the wheel assembly in place.

A second alternative shown in FIG. 5A is comprised of skis 20 in lieu of wheels to allow sliding movement, especially over snow or ice. The ski assembly includes a single swingarm 22 which is affixed to become a complete replacement for the wheel assembly shown in FIG. 6. While the ski assembly does not include the brakes used on the wheel assembly all other operation of the device remains similar to wheeled operation. In typical use most frozen surfaces are likely to be smoother than typical trail surfaces of rock, dirt or some combination thereof. This is particularly true if the device is used in fresh snow conditions, on a frozen water surface, or is towed in the packed track created behind a snowmobile. Accordingly, the narrowness which may be beneficial in a wheel assembly may not be necessary for a ski or skid assembly. In fact it may be desirable to have substantial surface area to provide "flotation" of the skis over a soft snow surface.

Figure 8:
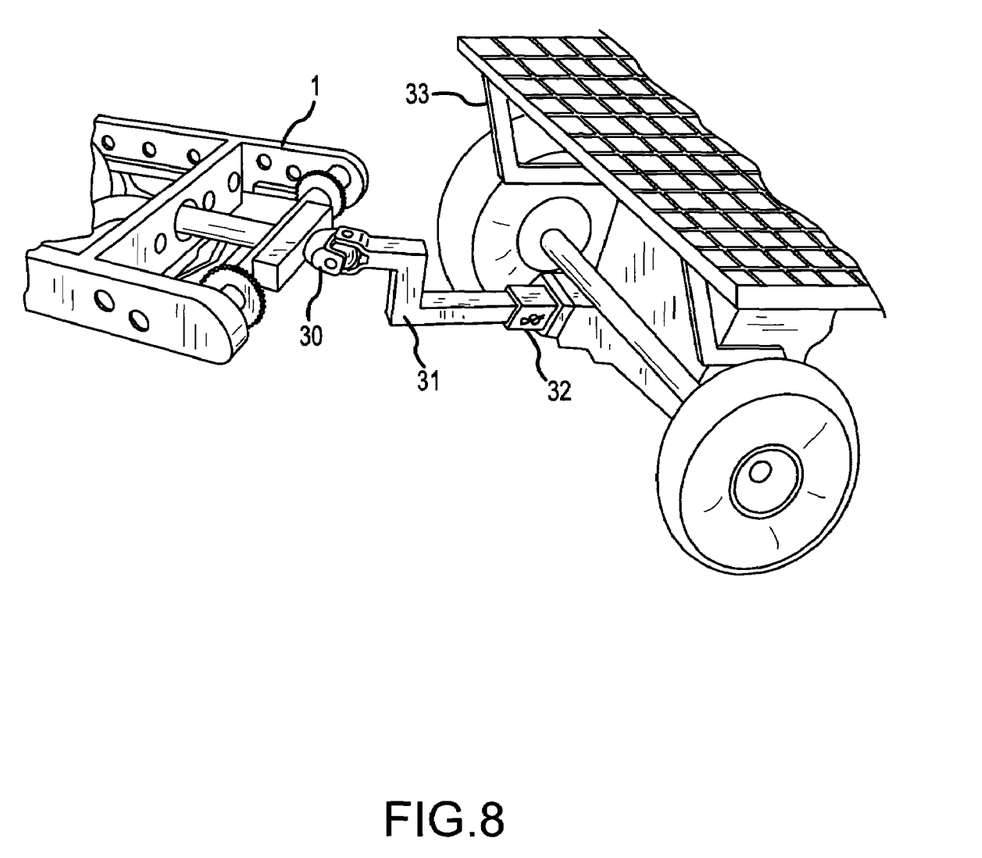
FIG. 8 is a perspective view showing a universal joint connection used when the device is towed behind a small vehicle.

While the device is primarily intended for use by human operators on foot it is also suitable for towing by a powered vehicle, including a snowmobile or ATV. In such use the device is attached to the tow vehicle using a pivoting structure which allows both vertical and horizontal side-to-side flexibility but does not allow torsional or twisting movement since the narrow wheel configuration does not provide inherent side-to-side stability. This allows the device to track in line behind the tow vehicle over irregular terrain yet provides stability for the towed device. The combination of flexibility and torsional rigidity is provided by a common universal joint 30 comprising two mating yoke ends arranged perpendicular to one another and connected with an "X" or "T" shaped connecting member so as to have two perpendicular intersecting axes of movement. A simple example of such a connection between a tow vehicle and the present device is shown in FIG. 8 where an ordinary universal joint 30 is placed in a detachable bar assembly 31 which connects to a receiver 32 on the tow vehicle 33 in the same manner as an ordinary trailer hitch.

Alternatively, the while the axes of movement of the connector should be perpendicular to achieve complete flexibility, the axes need not intersect and any similar connection which provides two perpendicular axes of movement may be used.

What is claimed is:

1. A mobile cart useful for moving an injured person over rough terrain, comprising:

a frame having a front end and rear end and a longitudinal length extending between the front and rear ends, the frame also having sides separated by a transverse width, the longitudinal length being greater than the transverse width, the longitudinal length and transverse width extending sufficiently to support the injured person in a supine position;

a support unit connected to the frame and supporting the frame above the terrain when moving the cart, the support unit including a contact structure for contacting the terrain, the contact structure located at a longitudinal position along the longitudinal length between the front and rear ends and at a transverse position along the transverse width between the sides, the support unit further including a height adjustment mechanism which is operative to establish a selectable height within a predetermined range of heights of the frame relative to the contact structure; and a front handle assembly and a rear handle assembly pivotally connected to the front end and rear end of the frame respectively, each of the front and rear handle assemblies pivoting into and between first and second positions, the first position extending the front handle assembly generally horizontally forward from the front end of the frame and extending the rear handle assembly generally horizontally rearward of the rear end of the frame to allow manipulation of the cart over the terrain when the frame is supported by the support unit at a selected height established by the height adjustment mechanism to place the contact structure in contact with the terrain for movement over the terrain, the second position extending the front and rear handle assemblies generally vertically downward from the front and rear ends of the frame to contact the terrain and support of the frame from the terrain through the front and rear handle assemblies when the height adjustment mechanism elevates the contact structure out of contact with the terrain; and wherein:

the predetermined range of heights established by the height adjustment mechanism is sufficient to elevate the frame for pivoting the handle assemblies from the first position to the second position while the frame is supported from the contact structure in contact with the terrain.

2. A mobile cart as defined in claim 1, wherein:

each of the front and rear handle assemblies pivoting into and between a third position in addition to the first and second positions, the third position extending the front handle assembly generally rearward from the front end of the frame and extending the rear handle assembly generally forward from the rear end of the frame to position both handle assemblies between the frame and the terrain when the frame is supported by the support unit with the contact structure in contact with the terrain.

3. A mobile cart as defined in claim 2, wherein:

a portion of each of the handle assemblies extends on opposite transverse sides of the contact structure when the handle assemblies are in the third position.

4. A mobile cart as defined in claim 1, wherein the contact structure comprises a singular wheel.

5. A mobile cart as defined in claim 4, wherein the wheel is an ATV type wheel.

6. A mobile cart as defined in claim 1, wherein the contact structure comprises a pair of wheels spaced side by side with respect to one another.

7. A mobile cart as defined in claim 1, wherein:

the contact structure comprises a wheel; and further comprising:

a brake attached to the support unit for selectively resisting rotation of the wheel.

8. A mobile cart as defined in claim 7, further comprising:

a brake actuator attached to at least one of the handle assemblies for controlling the brake.

9. A mobile cart as defined in claim 1, wherein:

the support unit further comprises a swing arm having a forward end connected at a pivot point to the frame at a position spaced more closely to the front end than to the rear end, the swing arm also having a rearward end located rearwardly of the pivot point; the swing arm pivoting about the pivot point in a plane which is generally orthogonal to a plane defined by the longitudinal length and transverse width of the frame;

the contact structure is connected to the rearward end of the swing arm; and the height adjustment mechanism is connected between the frame and a midpoint on the swing arm between the forward and rearward ends of the swing arm.

10. A mobile cart as defined in claim 9, wherein:

the height adjustment mechanism of the support unit comprises a spring assembly attached between the frame and the midpoint of the swing arm.

11. A mobile cart as defined in claim 9, wherein:

the height adjustment mechanism of the support unit comprises a sealed telescoping cylinder filled with compressed gas.

12. A mobile cart as defined in claim 11, wherein:

the height adjustment mechanism establishes the predetermined range of heights in accordance with the amount of gas compressed within the sealed telescoping cylinder.

13. A mobile cart as defined in claim 12, further comprising:

a source of compressed gas connected to the frame and to the sealed telescoping cylinder to supply compressed gas to the sealed telescoping cylinder.

14. A mobile cart as defined in claim 1, further comprising:

a locking mechanism for selectively retaining the front and rear handle assemblies in the first and second positions.

15. A mobile cart as defined in claim 14, wherein:

the selective locking mechanism comprises a circumferentially-extending fixed tooth gear connected to the frame and a mating tooth assembly connected to the handle assembly, the mating tooth assembly selectively engageable with the fixed tooth gear around a portion of its circumference.

16. A mobile cart as defined in claim 1, adapted to be towed by a tow vehicle further and further comprising:

an attachment for connection between the front end of the frame and the tow vehicle, the attachment comprising a pivoting structure which allows both vertical and horizontal side to side flexibility and which prevents twisting movement of the frame along an axis parallel to the longitudinal length of the frame, relative to the tow vehicle.

* * * * *